United States Patent
Patel et al.

(10) Patent No.: US 6,777,496 B2
(45) Date of Patent: Aug. 17, 2004

(54) POLYMERIC ADDITIVES AND POLYMERIC ARTICLES COMPRISING SAID ADDITIVE

(75) Inventors: Kundan M. Patel, Randolph, NJ (US); Charles Jay Nelson, Richmond, VA (US); Frank Mares, Whippany, NJ (US); Conor Twomey, Midlothian, VA (US); Yousef Mohajer, Midlothian, VA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/778,333

(22) Filed: Feb. 7, 2001

(65) Prior Publication Data

US 2002/0103299 A1 Aug. 1, 2002

Related U.S. Application Data

(60) Provisional application No. 60/253,384, filed on Nov. 28, 2000.

(51) Int. Cl.$^7$ .......................... C08L 67/02; C08L 77/00
(52) U.S. Cl. .................. 525/177; 525/175; 525/176; 525/183; 525/184; 525/217; 525/218; 525/220; 525/221; 525/222; 525/227; 525/240; 525/425
(58) Field of Search .................... 525/175, 176, 525/177, 183, 184, 217, 218, 220, 221, 222, 227, 240, 425

(56) References Cited

U.S. PATENT DOCUMENTS

| | | | |
|---|---|---|---|
| 3,378,056 A | 4/1968 | Robertson | 152/359 |
| 3,644,572 A | 2/1972 | Mayer | 260/857 |
| 3,786,018 A | 1/1974 | Nadler | 260/32.6 |
| 3,973,068 A | 8/1976 | Weber | 428/198 |
| 4,066,587 A | 1/1978 | Mains et al. | 260/22 D |
| 4,300,972 A | 11/1981 | Neubert | 156/307.5 |
| 4,447,572 A * | 5/1984 | Scharf | 524/371 |
| 4,473,617 A | 9/1984 | Van Leeuwen et al. | 428/373 |
| 4,640,962 A | 2/1987 | Ostrozynski et al. | 525/474 |
| 4,896,710 A | 1/1990 | Maeda | 152/556 |
| 4,929,388 A * | 5/1990 | Wessling | 252/500 |
| 4,987,030 A | 1/1991 | Saito et al. | 428/373 |
| 5,069,970 A | 12/1991 | Largman et al. | 428/373 |
| 5,221,384 A | 6/1993 | Takahashi et al. | 152/451 |
| 5,468,555 A | 11/1995 | Lijten et al. | 428/365 |
| 5,582,913 A | 12/1996 | Simons | 428/373 |
| 5,672,421 A | 9/1997 | Stanhope | 428/295 |
| 5,770,307 A | 6/1998 | Rackley et al. | 428/373 |
| 5,958,548 A | 9/1999 | Negola et al. | 428/92 |
| 6,143,368 A | 11/2000 | Gunn | 427/407.1 |

FOREIGN PATENT DOCUMENTS

| | | |
|---|---|---|
| EP | 083434 | 12/1982 |
| EP | 073838 | 3/1983 |
| EP | 188328 | 1/1986 |
| EP | 285692 | 10/1988 |
| EP | 467533 | 6/1991 |
| EP | 0471088 A1 | 2/1992 |
| EP | 528363 | 8/1992 |
| EP | 0331501 B1 | 1/1993 |
| EP | 763611 | 3/1997 |
| EP | 0703938 B1 | 11/1999 |
| GB | 610140 | 10/1948 |
| GB | 2103868 | 2/1983 |
| JP | 4336 | 2/1971 |
| JP | 294519 | 12/1991 |
| JP | 294537 | 12/1991 |
| WO | WO 94/18261 | 8/1994 |
| WO | WO 01/11122 A1 | 2/2001 |

OTHER PUBLICATIONS

Raj Iyengar, "Adhesion of Tire Cords—The Total Picture", Rubber World (1987), 197(2), 24–9.

Dr. W.G. Perkins, "Complexities in PET Tire Yarn Processing and Characterization", International Fiber Journal, Sep. 1987, pp. 42–50, 92.

* cited by examiner

Primary Examiner—Patricia A. Short
(74) Attorney, Agent, or Firm—Sandra P. Thompson; Bingham McCutchen LLP

(57) ABSTRACT

We have developed a process and product which provide thermoplastic articles featuring a permanent outer surface which has selectively varied chemical functionality while maintaining the inherent mechanical properties of the base fiber. The process comprises the steps of:

(a) adding a substantially organic molten component with CSP value of at least 8 to a molten thermoplastic polymer and mixing to substantially uniformly disperse the molten component in the molten thermoplastic polymer and form a heterogeneous blend wherein
  (i) the melt viscosity of the molten component is substantially less than the melt viscosity of the molten thermoplastic polymer; and
  (ii) the amount of the molten component in the molten thermoplastic polymer is up to about ten percent by weight based on the heterogeneous blend; and
(b) melt processing the heterogeneous blend wherein the molten component preferentially locates near the surface of the molten thermoplastic polymer and substantially no chemical reaction occurs between the molten component and the molten thermoplastic polymer.

18 Claims, 4 Drawing Sheets

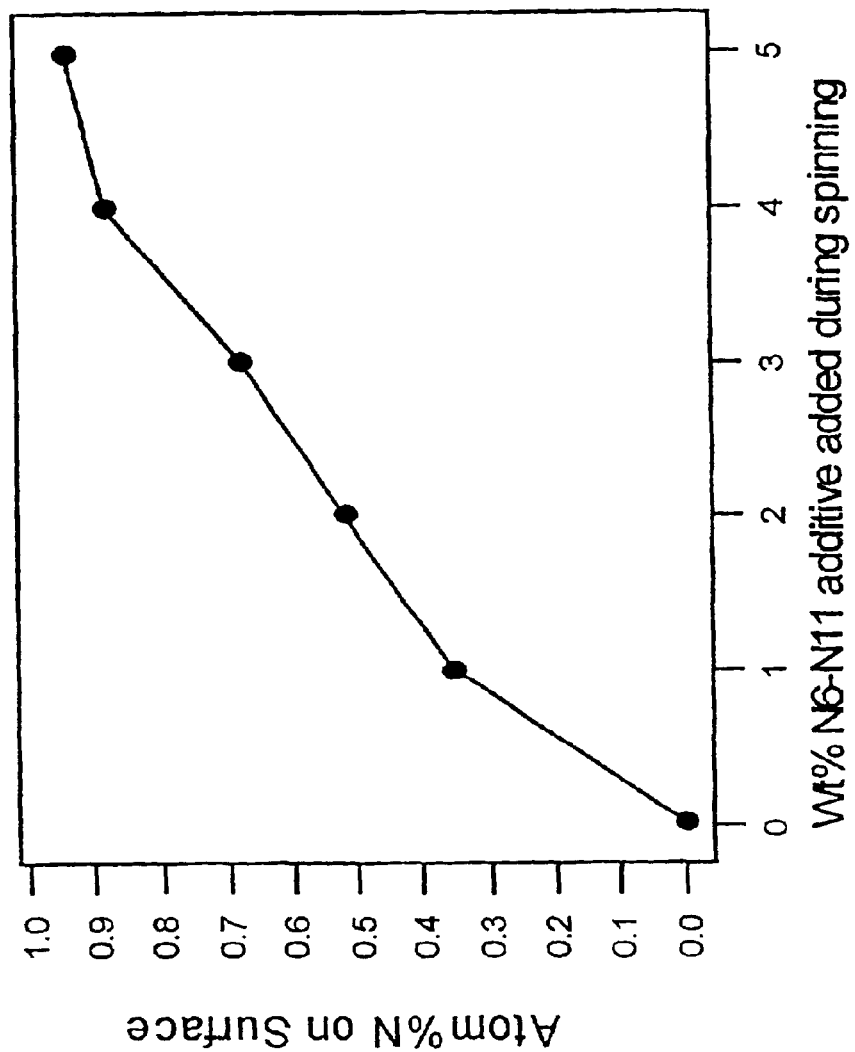

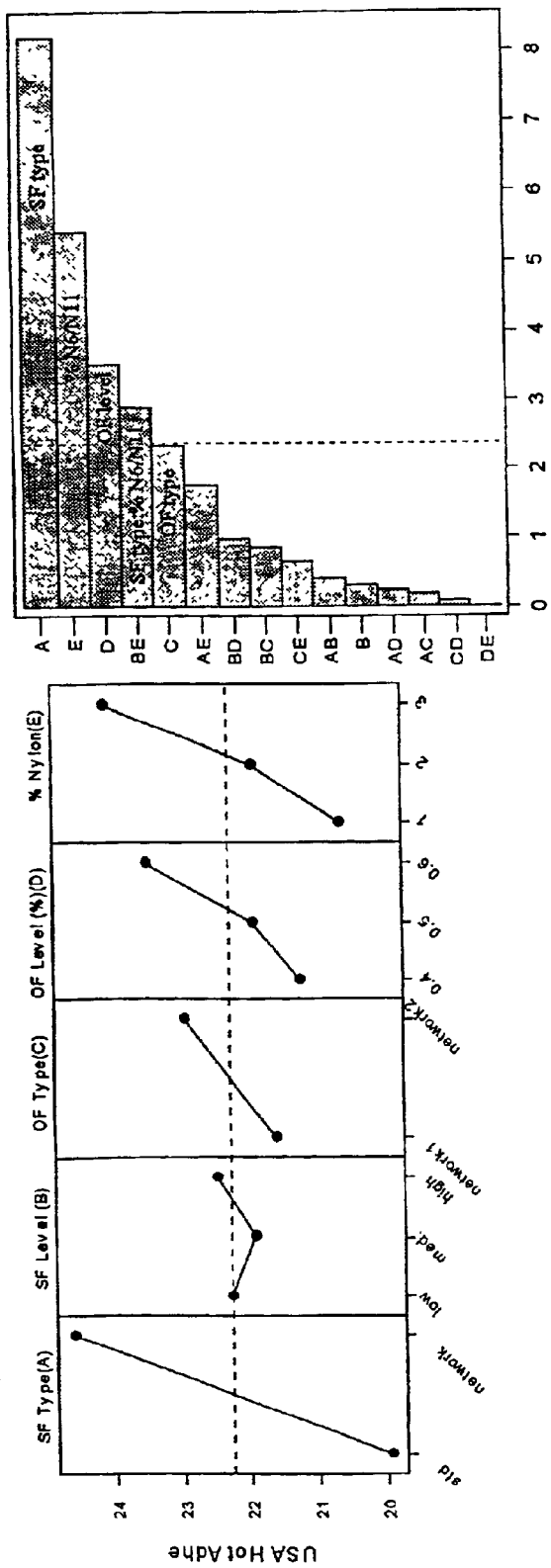
Fig. B DOE results define system robustness

Fig. C. SEM Micrograph
PET 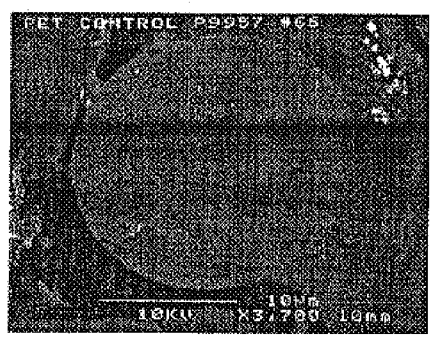 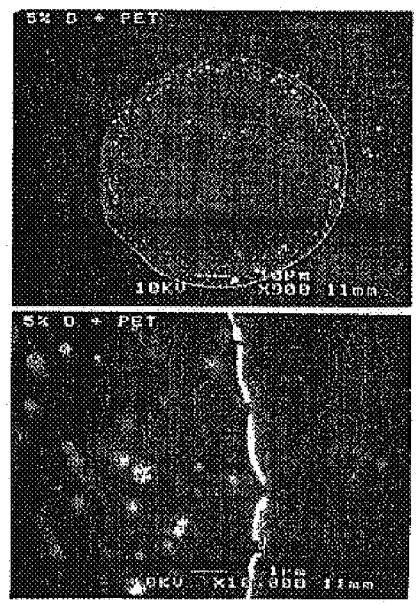 CTB-modified PET

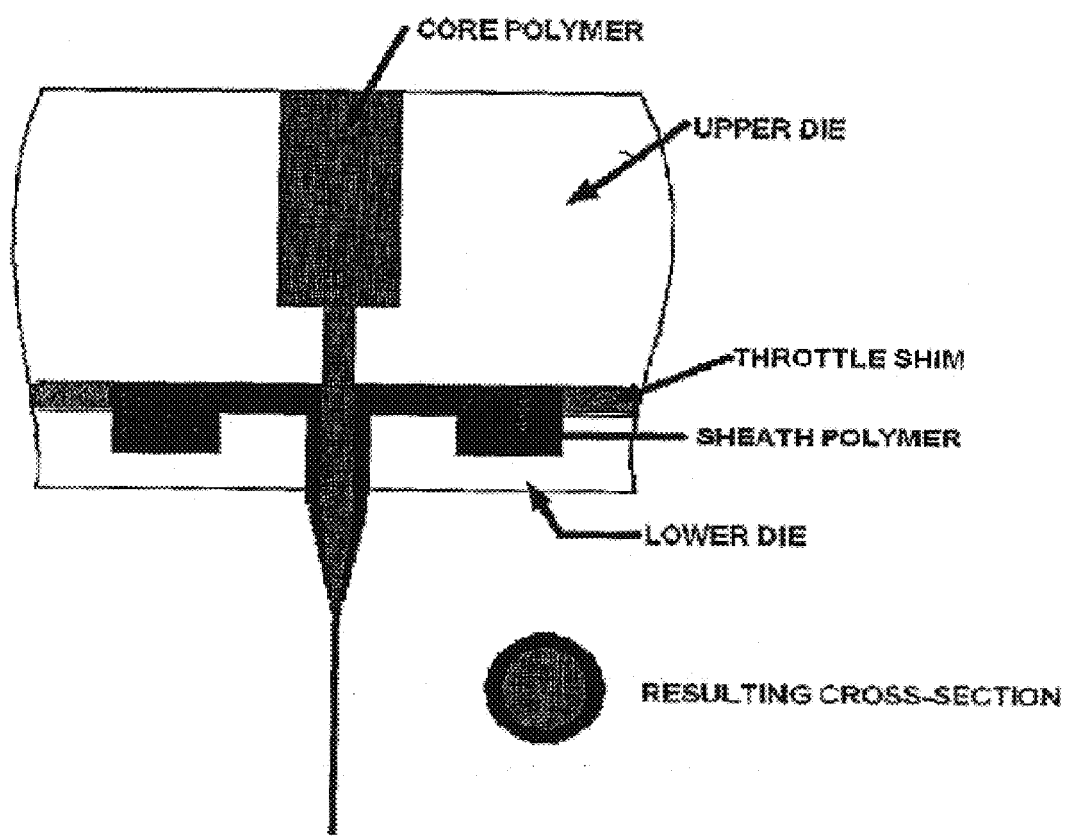
Fig. D Bi-component Spinnerette Assembly

POLYMERIC ADDITIVES AND POLYMERIC ARTICLES COMPRISING SAID ADDITIVE

This application claims the priority of provisional patent application 60/253,384 filed Nov. 28, 2000.

BACKGROUND OF THE INVENTION

Today numerous different thermoplastic polymers are commercially used because each has a combination of physical characteristics that make it well-suited for particular applications. In many instances, it is an undesirable characteristic that prevents a thermoplastic polymer from fully participating in some applications. For example, thermoplastic polyester has a good combination of strength, dimensional stability, and cost, but surface related problems such as adhesion, UV resistance, abrasion resistance, etc. inhibit its potential.

Polyester fiber replaced nylon fiber in passenger tire bodies because polyester was more dimensionally stable and hence the resulting tires did not exhibit objectionable flat-spotting. Due to its combination of strength and dimensional stability, polyester remained the preferred tire body reinforcement as passenger tires went from bias to radial constructions. Polyester's poor adhesion to rubber was overcome by using aggressive adhesion promoters in combination with higher temperatures and residence times in down-stream dipping and heat-setting operations. See for example U.S. Pat. No. 4,300,972 and W. G. Perkins, "Complexities in PET Tire Yarn Processing and Characteristics", International Fiber Journal 42 (September 1987) and R. Iyengar, "Adhesion of tire cords—the total picture", RUBBER WORLD 197(2) 24(1987). This added cost from reduced output, higher energy input, and control equipment for containing the added environmentally unfriendly chemicals makes the conventionally used dip additives for adhesive promotion unattractive. Even with its objectionable flat-spotting, nylon is preferred over polyester in tire cap plies due to at least partly its inherently better hot adhesion. Thus, an article having a combination of polyester physical properties with a "nylon-like" surface would be highly desirable for tire applications.

Reduced friction during polymeric fiber processing and abrasion during end-use are also currently addressed by topically applying a finish during fiber spinning and drawing. These finishes are applied as solutions or emulsions and hence have the difficulties discussed above. Similarly, a polymeric fiber having a permanent outer layer exhibiting low friction and/or abrasion resistance would be a highly desirable solution.

Ultraviolet ("UV") resistance is currently improved by introducing UV "screens" via topically applied coatings or additives to the polymer melt. Coatings lack permanency. Uniform addition to the fiber adds extra cost, but little benefit from "screens" located well below the surface. Preferential location of a UV stabilizer in a permanent layer near the surface would be a highly desirable solution.

A seldom used approach for fiber production has been the incorporation of low molecular weight additives which "bloom" to the surface during fiber extrusion, fiber drawing, and/or during subsequent use. This approach avoids the environmental issues associated with the above approaches, but it does not produce the sought-after permanent surface for applications where abrasion or shear at the fiber/matrix surface is present. Blooming is disclosed in U.S. Pat. No. 3,973,068 wherein a surfactant is added to polyolefin and the surfactant migrates to the fiber surface and reduces secondary bonding. U.S. Pat. No. 4,640,962 teaches a silicone-sheathed polyester fiber wherein (1) the silicone is added from 0.1 to 10 weight percent to the polyester, (2) per column 8, lines 24–27, microdomains (preferably less than 1 micron) are formed "so that the endgroups of all of the polysiloxane block polymer have an opportunity to condense with the polyester," and (3) the microdomain migrates to the fiber surface during spinning and drawing. Per column 8, lines 50–53, "surprisingly, the migration of the silicone domains has been found to continue during drawing, including cold drawing . . . ." The low inherent surface energy for the polysiloxane and resulting driving force to occupy a surface geometry was sufficient for the formation of a "silicone sheath."

Similarly, U.S. Pat. No. 5,069,970 teaches the use of low surface energy organic polymers to preferentially locate at the surface of PET fibers for use as high capacity air filter fibers. Polypropylene and poly(methylpentene) are the only additives in the patent examples. A wider range of polymers is suggested in the patent text, but all the polymers are inherently inert and incapable of thermally reacting with PET.

In contrast in the present invention, additives with higher surface energies are preferentially located at the article surface. Therefore, although not wishing to be bound by theory, it is believed that the mechanism for this invention is fundamentally different in a manner that provides much greater opportunity for surface engineering. Furthermore, the surprising ability to incorporate reactive groupings such as amides, esters, unsaturated olefins, etc. into melt formed articles while maintaining the base thermoplastic properties and achieving the desired propensity for bonding is a further differentiating feature.

This invention relates to heterogeneous or immiscible blends of two or more polymers. The Encyclopedia of Polymer Science and Engineering 12, 403–424 (1988) reviews the various methods for establishing blend heterogeneity. Thermal (DSC & DTA), Dynamical Mechanical, and Microscopy (optical, TEM, SEM) methods are particularly useful. As general guide, blend miscibility can be estimated using solubility parameters (see M. M. Coleman et. al. Polymer 31, 1187 (1990)). A lower solubility parameter signifies a lower surface energy and hence a greater propensity to preferentially locate at the article surface. For this invention, solubility parameters are defined in terms of the values calculated using Coleman's methodology and his constitutive molar volumes and attraction constants. When using copolymeric additives, the relative abundance of the constitutive functional units is proportionated in accordance with their mole fraction. Therefore, the calculated solubility parameter for a Nylon 6/Nylon 11 copolymer with 33 mole % Nylon 6 would be calculated as follows:

$$\{0.33[5\times132+405]+0.67[10\times132+405]\}/\{0.33[5\times16.5+19.2]+0.67[10\times16.5+19.2]\}=9.6$$

End-capping agents would also be included in the analysis and would also be proportionated on a mole fraction basis. For ease of reference these calculated solubility parameters will be referred to as "CSP" values.

The CSP value is 7.4 for both the polypropylene and poly(methyl pentene) exemplified in above U.S. Pat. No. 5,069,970. In the broadest patent claim, polybutylene has the highest CSP value at 7.6. This patent teaches the most preferred polyolefins have high molecular weight in the 50,000 to 500,000 range.

The desire to have a certain base fiber for mechanical properties and cost and a permanent outer layer or sheath with markedly different physical characteristics has been a major driving force for bi-component spinning. While this approach does provide the basic fiber structures desired as solutions for the above problems, it has disadvantages. First, additional equipment is required including an additional extruder to introduce the sheath polymer and sophisticated spinnerettes to channel that sheath polymer to extrude it as the outer layer of the individual filaments. For current day multi-end processes, these spinnerettes can have 1000 extrusion holes. Second, it is quite difficult to make sheath-core filaments where the sheath is present at 5% or less of the fiber volume. Both factors represent significant added cost in terms of added equipment, excess sheath weight, and scrap arising from added process control difficulties. Also, the melt viscosity of the sheath and core must be similar in order to be spinnable. Finally and possibly most importantly, poor adhesion between the fiber core and the sheath often occurs resulting in a propensity for failure via delamination at the sheath-core interface. This would be particularly problematic in tire applications where there is high strain flexing of the filaments.

U.S. Pat. No. 5,468,555 claims sheath/core yarns with uniform sheath dimensions throughout the yarn bundle. This patent teaches the extrusion process for making these more uniform filaments and discloses suitable sheath polymers for polyethylene terephthalate ("PET") to be nylon66, polyether sulphone, polyimide, polytetrafluoroethylene, polyphenylene sulfide, and polypropylene. While this list covers a wide range of polymers, only PET with a high molecular nylon 66 sheath is exemplified. This nylon66 sheath is present from 6.9 to 15.2% (by volume). Some yarns were converted into dipped tire cord, but no adhesion data was provided. Comparative Examples BF1–9 in this disclosure cover PET with Nylon 6 sheath ranging from 1–20%. SEM micrographs for the yarns with 1 and 5% sheath levels show substantial delamination even in the undrawn state. The 20% sheath samples did not exhibit this delamination in the undrawn or drawn yarns. However, adhesion for the treated cord was well-below that for a nylon surface due to premature delamination during the adhesion test. Such delamination occurs because there is no chemical or physical reaction occurs between the core and sheath materials. This propensity for delamination is supported by U.S. Pat. No. 5,582,913 and European Patent 471,088A1 which teach in their background sections that separation of a PET core from a nylon 6 sheath is a common problem and shows in FIG. 2, that the core and sheath break separately thus reducing the fiber strength. Although U.S. Pat. No. 5,582,913 teaches that delamination during tensile testing can be reduced by introducing a nylon 6/nylon 12 copolymer to improve the compatibility between the sheath and core, no data is presented to show that the adhesion between the sheath and core is sufficient to provide good adhesion of the resulting fibers to rubber. Furthermore, the above-mentioned comparative fibers with 1–20% nylon6 sheath showed increased sheath volume fraction reduced delamination, but adhesion performance was still inferior. Since the examples in U.S. Pat. No. 5,582,913 have 50% sheath, the absence of apparent delamination during the tensile test is no indication of adequate adhesion performance at 10% or less sheath levels. European Patent 471,088A1 requires a complicated series of extruders and special spinnerets to achieve protrusions between the sheath and core. See also U.S. Pat. No. 4,859, 759. The following Table lists other references teaching higher sheath percentages:

|  | CORE MATERIAL | SHEATH MATERIAL AND PERCENTAGE PRESENT |
|---|---|---|
| US PATENT |  |  |
| 4,473,617 | PET | 15–50 volume % nylon 6 |
| 4,896,710 | Polyester | 40–60 weight % polyamide |
| 4,897,030 | Polyester | 10–70 weight % polyamide |
| 4,987,030 | PET | 20–50 weight % nylon 66 |
| 5,221,384 | Polyester | 10–90 weight % polyamide |
| 5,672,421 | PET | 20 weight % low-melting point polymer |
| 5,770,307 | Copolyester ether | 10–90 weight % nylon 6 |
| 5,958,548 | PET | 20–50 weight % nylon 6 |
| European Patent |  |  |
| 331,501B1 | PET | 10–70 weight % nylon 66 |
| JAPANESE KOKAI PATENT PUBLICATION |  |  |
| 294519 (published 12-25-91) | PET and polyethylene naphthalate ("PEN") Blend | 5–80 weight % nylon 66 |
| 294537 (published 12-25-91) | PEN | 10–70 weight % nylon 66 |

Another approach for fiber production is blends as disclosed in U.S. Pat. No. 4,066,587 wherein a polyamide (formed from a long-chain dibasic acid containing at least 18 carbon atoms and a diamine) is added at 0.01 to 20 weight percent to polyester. Example VII represents the closest art in U.S. Pat. No. 4,006,587 and it is outside this invention because the polyamide is not end-capped and hence will react with the polyester thereby lowering its viscosity and impeding movement of the additive to the fiber surface. See Japan Patent Publication 4336-1971 (published Feb. 3, 1971) teaching melt spinning polyester at 10–40 weight percent in polyamide. The following Table lists other blends.

|  | BLEND |
|---|---|
| US PATENT |  |
| 3,410,749 | 1 to 15 weight % of poly(vinylpyridine) in polyester |
| 4,518,744 | 0.1 to 10 weight % of polyamide in polyester wherein polyamide is immiscible in the polyester and forms spherical particles dispersed in continuous polyester matrix and upon spinning, forms microfibrils in the resulting fiber |
| 4,874,800 | 0.05 to 14 weight % of polyamide in liquid-crystalline polyester |
| 5,216,103 | 0.05 to 1 weight % of polysiloxane containing reactive groups linked to polyolefin, polyester, or polyamide matrix |
| European Patent |  |
| 526,740B1 | 0.5–5 mole % aliphatic α,β-dicarboxylic acids with 5–10 carbon atoms in polyester |

Another approach for fiber production is copolymers as disclosed in commonly assigned European Patent 703, 938B1. The starting polymers in the melt react together to form copolymers.

Surface modified polyamides are known.

| U.S. PAT. NO. | SURFACE MODIFICATION |
|---|---|
| 3,931,118 | Terminal sulfonate groups |
| 3,652,500 and 4,755,585 | End-capped with aniline groups |
| 4,778,843 | Both ends are capped with 8–22 carbon atom monocarboxylic acid having at least one of olefinic unsaturation and hydroxyl group |
| 5,180,802 | Both ends are alkylamine terminated or alkylacid terminated. |
| 5,371,175 | Epoxy terminated |

Thus, the art needs a fiber with polyester physical properties and a permanent outer layer providing functionality not normally provided by or associated with polyester. Desirable outer layers include a nylon-like surface having good adhesion between the two polymeric surfaces and polyolefin-like surface having improved lubricity and abrasion resistance. The art also needs a process for making such a fiber wherein the process avoids the deficiencies and problems associated with sheath-core fiber.

SUMMARY OF THE INVENTION

This invention responds to the need for thermoplastic articles which maintain their inherent mechanical properties and cost structure yet have a permanent outer surface that has selectively varied chemical functionality. The major benefit is to overcome inherent deficiencies related to: (1) article incompatibility with different composite matrices, (2) inadequate environmental stability (light, chemical, etc.), and (3) general surface-related end-use characteristics such as poor abrasion resistance, excessive friction, etc. The present invention describes the additives, the fiber-making process, and the resulting novel articles. The process involves (a) adding a substantially organic molten component with CSP value of at least 8 to a molten thermoplastic polymer and mixing to substantially uniformly disperse the molten component in the molten thermoplastic polymer and form a heterogeneous blend wherein
  (i) the melt viscosity of the molten component is substantially less than the melt viscosity of the molten thermoplastic polymer; and
  (ii) the amount of the molten component in the molten thermoplastic polymer is up to about ten percent by weight based on the heterogeneous blend; and
(b) melt processing the heterogeneous blend wherein the molten component preferentially locates near the surface of the molten thermoplastic polymer and substantially no chemical reaction occurs between the molten component and the molten thermoplastic polymer.

The selection criteria for this additive polymer or molten component are fourfold: (1) the additive has the sought-after characteristics desired for the article surface, (2) the additive forms a well-dispersed heterogeneous blend structure with the thermoplastic polymer matrix, (3) there is substantially no reaction between the additive and base polymers during melt formation, and (4) the additive's melt viscosity at the melt formation temperature is substantially lower than that for the base polymer. We believe, but are not bound, that the mechanism wherein the tendency for the low viscosity component to locate at the ultra high shear region adjacent to apparatus stationary surfaces is a primary driving force for it to preferentially locate at the article surface. The propensity for the low viscosity additive to "wet" the extrusion surface may also play a role. The term "substantially lower" viscosity means the ratio of the base molten polymer to the molten additive at the melt processing temperature is at least about 1.5/1, preferably at least about 3/1, and most preferably at least about 10/1. The term "substantially organic" means 85% of the polymer is based on organic molecules as exemplified in the present invention by polyethylene, polybutadiene, and polyamides.

We responded to the need for additives meeting the above criteria and have developed surface activating polyamide (Formula (I)) and polyolefin (Formula (II)) additives.

Formula (I) is an end-capped polyamide or copolyamide of moderate molecular weight comprising one or more of any of the following units (a) —[—NH—$(CH_2)_x$—C(=O)—]— where x=3–30; or
(b) —[—NH—$R_1$—NH—C(=O)—$R_2$—C(=O)—]—
where $R_1$ and $R_2$ are independently selected from
  (i) —$(CH_2)_Y$— or where Y=1–30; or
  (ii) —$CH_2$—$(CH_2$—O—$CH_2)_Z$—$CH_2$— where Z=1–30; or
  (iii) for $R_2$, hydrocarbon component comprising acyclic, monocyclic, bicyclic, and aromatic units and are partially or fully hydrogenated as long as the resulting additive has a lower melting point than the thermoplastic polymer and the polyamide or copolyamide is terminated to reduce the free carboxyl and amine end-groups. The terminating agents have functional groups capable of reacting with the free carboxyl or amine end-groups and consist of a substituted or unsubstituted aliphatic or aromatic groups having from two to 100 carbon atoms.

Formula (II) is derived (prepared) from an end-capped polyolefin of moderate molecular weight and contains any of the following units (a) —[—NH—$R_3$—NH—]—
(b) —[—C(=O)—$R_4$—C(=O)—]—
where $R_3$ and $R_4$ are polyolefin residues with degree of polymerization up to 250.

The terminating agents are similar to those described for Formula (I).

These additives are preferably used in thermoplastic polymers and more preferably in polyester.

Other advantages of the present invention will be apparent from the following description, attached drawings, and attached claims.

BRIEF DESCRIPTION OF THE DRAWINGS

FIG. A is a plot of the % atomic nitrogen near the fiber surface as measured by X-Ray Photoelectron Spectroscopy as a function of the amount of Nylon 6/Nylon 11 copolymer added to the polymer melt prior to spinning for Inventive Examples F1 through F2 and their analogs in the 1–5% additive level series.

FIG. B represents the main Effects and Pareto of Standardized Effects for the Hot Adhesion response for a Designed Experiment where the 5 independent variables were: spin-finish type, spin-finish level, over-finish type, over-finish level, and amount of Nylon 6/Nylon 11 copolymer additive in the fiber for Inventive Example F38.

FIG. C is SEM micrograph of fiber cross-section of PET fiber with 5% carboxyl terminated polybutadiene additive after staining with osmium tetraoxide for Inventive Examples F25–27.

FIG. D is a schematic of spinnerette assembly for making Bi-component fibers for Comparative Examples BF4–9.

DETAILED DESCRIPTION OF THE PREFERRED EMBODIMENTS

Unlike known surface modifiers based on polyamides, the present invention provides a novel additive, surface activating polyamide additive (Formula (I)), specifically designed for modifying polyester surfaces. This additive is an end-capped polyamide or copolyamide of moderate molecular weight comprising one or more of any of the following units (a) —[—NH—$(CH_2)_x$—C(=O)—]— where x=3–30; or
(b) —[—NH—$R_1$—NH—C(=O)—$R_2$—C(=O)—]—
where $R_1$ and $R_2$ are independently selected from
 (i) —$(CH_2)_Y$— where Y=3–30; or
 (ii) —$CH_2$—$(CH_2$—O—$CH_2)_Z$—$CH_2$—where Z=1–30; or
 (iii) for $R_2$ only, the dimer acid hydrocarbon component comprising acyclic, monocyclic, bicyclic, and aromatic units that are partially or fully hydrogenated as long as the resulting additive has a lower melting point than the thermoplastic polymer and the polyamide or copolyamide is terminated to reduce the free carboxyl and amine end-groups wherein the terminating agents have functional groups capable of reacting with the free carboxyl or amine end-groups and consist of a substituted or unsubstituted aliphatic or aromatic having from one to 100 carbon atoms, preferably 1–20, and preferably some unsaturation to react with groups when used in a rubber matrix. The weight-average molecular weight of the moderate molecular weight additive is preferably greater than about 1000 to less than about 25,000, and more preferably about 5,000 to about 15,000. Functional groups highly reactive with polyester in the melt are excluded. Examples of these highly reactive groups would be sulfonate, aniline, and epoxy. Useful dimer acids are oligomerized $C_{18}$ unsaturated fatty acids commercially available as Empol® dimer acids from Cognis.

Preferably, two different (a) units are used and x is from 3 to 15. For rubber composite applications, preferred terminating agents have some unsaturation as exemplified by linoleic acid and oleyl amine.

For more olefinic character and greater potential for direct reaction and/or compatibility with elastomeric matrices, a second additive (Formula (II)) was also developed. It is derived (prepared) from an end-capped polyolefin of moderate molecular weight and comprising any of the following units (2) —[—NH—$R_3$—NH—]—
(3) —[—C(=O)—$R_4$—C(=O)—]—
where $R_3$ and/or $R_4$ are polyolefin residues with degree of polymerization (dp) up to 250.

The terminating agents are similar to those described for Formula (I). Preferably, the polymerized olefin residue is a rubber, and is most preferably polybutadiene or a copolymer of such with dp from about 20 to about 150.

The following general method for making Formula (I) or Formula (II) additives has been demonstrated on a 5-gallon bench scale and in 175-gallon and 500-gallon pilot scale reactors.

Amino acid, cyclic lactam, amine, organic acid, and water were fed to an autoclave having an agitator. The non-limiting Inventive Examples below illustrate the use of the specific starting materials and the ratio of the starting materials. Buildup of powder on the agitator and reactor walls may prevent components from participating in the reaction. The ratio of all five starting components varied according to the desired molecular composition of the Formula (I) or Formula (II) additive.

The pressure profile was typical of batch polymerization of nylon. The reaction mixture was heated to a temperature of about 200 to about 230° C. in a nitrogen atmosphere. At this point, the vapor pressure in the autoclave reached about 60 to about 100 pounds per square inch. The temperature of the reaction mixture was increased to about 250 to about 260° C. This temperature was maintained until the rate of generation overheads sharply declined, about 60 to about 90 minutes. The pressure was reduced at a controlled ramp-down rate until the pressure in the autoclave reached atmospheric pressure. This pressure was again maintained with a nitrogen sweep until no more overheads were generated.

The pressure was then reduced to a final target of less than 10 mm Hg while keeping temperature at 245° C. to promote polycondensation. During the vacuum cycle, the agitator torque increased to its target value. This increase was gradual at first, with a very steep climb at the end of the cycle. The final product rheology resembled that of nylon. The product was extruded onto chilled water and collected as pellets.

The Formula (I) additive may be used as a flushing agent, lubricating agent, color concentrate, film-to-film bonding agent, oxygen scavenger, or used in polymers (exemplified below). The Formula (II) additive may be used as a spinning aid, lubricating agent, oxygen scavenger, molding aid, color concentrate, flushing agent, crosslinking agent, or used in polymers. Preferably, the Formula (I) and (II) additives are used in polymers as described below.

The present invention also provides the following process comprising the steps of:
 (a) adding a substantially organic molten component with CSP value of at least 0.8 to a molten thermoplastic polymer and mixing to substantially uniformly disperse the molten component in the molten thermoplastic polymer and form a heterogeneous blend wherein
  (i) the melt viscosity of the molten component is substantially less than the melt viscosity of the molten thermoplastic polymer; and
  (ii) the amount of the molten component in the molten thermoplastic polymer is up to about ten percent by weight based on the heterogeneous blend; and
 (b) melt processing the heterogeneous blend wherein the molten component preferentially locates near the surface of the molten thermoplastic polymer, and substantially no chemical reaction occurs between the molten component and the molten thermoplastic polymer.

Preferably, the additive preferentially locates at the fiber surface in a manner so that "rivet regions form" thereby avoiding the formation of the well-defined "interface" and resulting tendency toward de-lamination that is characteristic of prior art sheath/core fibers.

The phrase "to substantially uniformly disperse" as used herein excludes sheath-core yarns formed with two spinneret plates such as taught by U.S. Pat. No. 5,468,555 and 5,582,913.

The phrase "heterogeneous blend" as used herein means at least two phases are present as evidenced by microscopic examination or little change in glass transition temperature compared with polyester alone and thus, excludes copolymers such as taught by U.S. Pat. No. 4,640,962.

The phrase "substantially no chemical reaction occurs" as used herein excludes copolymers such as taught by commonly assigned European Patent 703,938B1 and copolymers resulting from chemically bound sheath-core yarns such as taught by U.S. Pat. No. 4,640,962.

The phrase "rivet regions form" as used herein means that both the molten component and the molten thermoplastic polymer co-exist in sufficient quantities throughout the fiber radial direction and thus there are no annular rings with the sharp interface characteristic of prior art sheath-core fibers. The result is cohesive strength throughout the fiber sufficient to preclude the catastrophic delamination also characteristic of sheath-core fibers. The absence of a sharp interface and the substantial no delamination further distinguish the present invention over and excludes sheath-core yarns formed with two spinneret plates such as taught by U.S. Pat. No. 5,468,555 and 5,582,913.

Any molten component that may be substantially uniformly dispersed in a molten thermoplastic polymer to form a heterogeneous blend may be used, provided the above-mentioned limitations are met. Examples of useful molten components includes the Formula (I) and (II) additives, polyolefins, and polyvinyls.

Any thermoplastic polymer may be used in the present invention, provided the thermoplastic polymer has the desired mechanical properties for the application and a suitable molten component is available. Useful thermoplastic polymers include polyesters, polyamides, polyimides, polysulfones, polyphenylene sulphide, polyvinyls, polyethylene glycol, polyolefins, and copolymers or blends thereof.

Useful polyesters include poly(ethylene terephthalate); poly(butylene terephthalate); poly(cyclohexanedimethylene terephthalate); and poly(ethylene naphthalene-2,6-dicarboxylate).

Useful polyamides include polycaprolactam; polyhexamethylene adipate; and polybutylene adipate.

Useful polysulfones include the reaction products of sulfonyl halide with aromatic containing organic monomers or polymerization of monomers containing sulfone groups.

Useful polyvinyls include polymethyl methacrylate and other acrylates.

Useful polyolefins include polyethylene; polypropylene, and polyphenylene ether.

Formation of the uniformly dispersed molten polymer blend may occur within readily available polymer mixing equipment such as twin screw extruders (U.S. Pat. No. 5,830,811) or static mixers from vendors such as Kenics or Komax.

The present fiber can have any cross section.

The present fiber may be formed as follows. A 1000 denier thermoplastic polymer yarn containing 0.1 to 10 wt % additive Formula (I) or (II) type was produced by uniformly dispersing the additive in molten thermoplastic polymer, subsequently extruding a plurality of individual filaments (for example 300–400 filaments) into thermal/quenching zones where the filaments are solidified under desired temperature/stress histories, then taking up the solidified filaments, and finally hot drawing them to achieve the desired properties. The fiber may be spun and drawn by a known method such as disclosed in commonly assigned U.S. Pat. Nos. 5,132,067 or 5,630,976 relating to high speed spinning or U.S. Pat. Nos. 4,251,481 and 4,349,501 relating to conventional spinning speed, all incorporated herein by reference to the extent necessary to complete this disclosure.

The performance of the above fibers having an enriched concentration of the invention additives near the fiber surface may be further enhanced by proper design of the fiber spin-finish and subsequent fiber over-finishes or coatings available in the prior art. For example, polyester adhesion to rubber can be improved by topically applying epoxies or blocked isocyanates in the fiber finish or resorcinol formaldehyde latex ("RFL") dip. Epoxide containing additives such as polyglycidyl ethers (U.S. Pat. Nos. 4,462,855; 4,557,967 and 5,547,755) and multifunctional epoxy silanes (U.S. Pat. No. 4,348,517) are particularly effective finish additives. Additives which form epoxides in situ such as halogenated polyethers (U.S. Pat. No. 4,929,769) would fall within that were calculated as follows. Relative viscosity is $\eta_r = t/t_0$ where $\eta_r$=relative viscosity; t=flow time of solution in seconds; and $t_0$=flow time of solvent in seconds. Intrinsic viscosity is $[\eta]=([1+4k(\eta_r-1)]^{0.5}-1)/8kW_s$ where $[\eta]$=intrinsic viscosity; $\eta_r$=relative viscosity; $W_s$=sample weight; and k=Huggins constant. Huggins constant was constant for solvent, sample, and testing conditions. For PET in this solvent, under these conditions, k=0.355. Intrinsic viscosity results were reported to three significant figures.

(2) Formic Acid Viscosity (FAV)—A 5.500 gram polymer sample of additive material was diluted by the addition of 90.0% +/−0.2% formic acid. The sample was dissolved by means of a wrist-action shaker over 1–2 hours. Upon complete dissolution of the polymer, a 10.0 mL aliquot was transferred into a 200-bore Cannon-Fenske viscometer. The sample solution was equilibrated in a 25.00+/−0.05° C. constant temperature bath for a minimum of 30 minutes. Flow times were then measured until three successive readings agree to within 0.2 seconds. The formic acid viscosity (termed NES viscosity) was calculated by multiplying the mean of the three successive flow times by a derived calibration factor($k_v$). The calibration factor was determined by the following equations:

$$K_v=(0.77621) \times f_v, \text{ where}$$

0.77621=density of nylon-6 polymer solution in 90% formic acid (1.1876 g/cc) divided by the absolute viscosity of 90% formic acid (1.530)

$f_v$=viscometer factor, as determined by the average of $f_6$ and $f_{20}$. These two values are independently measured factors for s-6 and s-20 calibration oils (NIST-traceable). This factor is calculated by dividing the average flow time of the respective oil epoxide containing additive classification. The above cited reference by R. Iyengar reviews the use of epoxide and blocked isocyanate containing additives in RFL coatings.

The present fiber may be used to to reinforce tire components such as carcass, belt, and cap plies. The latter is generally a Nylon fiber-reinforced rubber sheet or strip overlayed over tire steel belts. See M. J. Roden, "The Use of Nylon Cap Ply to Improve Passenger Car Tyre High Speed Performance", Tyretech 90 (Nov. 5–6, 1990). Tires have been made with PET reinforced cap plies (U.S. Pat. Nos. 6,082,423; 6,016,857; and 6,016,858), but inadequate hot adhesion has precluded penetration into cap plies in spite of its inherent advantage of much lower flat-spotting versus nylon. U.S. Pat. No. 4,739,814 teaches the use of a special fabric design to overcome the adhesion deficiency associated with prior art polyesters. This approach limits the design flexibility to maximize tire performance.

Analytical Test Methods:

The various analytical test methods are described below. The number of required duplicate tests depends on the measurement system capability in the specific laboratory and the closeness of the measurement to the specification limits, i.e., the required discrimination level. Standard statistical variation methodology (for example, MINITAB software from Minitab, Inc.) provides the needed procedures.

(1) Intrinsic Viscosity (IV): A 0.12 to 0.14 gram polyester polymer sample (in one of the following forms: chips, free-fall, or finish-free fiber) was diluted with 25 ml 60/40 wt % phenol/sym-tetrachloroethane and the mixture was then heated at 97° C in a shaker bath at 90–100 rpm for 75 minutes. (If the fiber had finish, it was removed by placing the fiber in a beaker, covering the fiber with hexane, and placing in a sonic bath for 20 minutes at room temperature). A Schott America 538-20/II microbore viscometer was used to measure flow time at 25.00±0.02° C. for solvent mixture and sample solutions. The relative viscosity and intrinsic viscosity into the kinematic viscosity for that oil at 25° C. Thus, $f_6 = 8.93/t_6$, for an s-6 viscosity calibration oil having a kinematic viscosity of 8.93 cSt at 25.0° C.

(3) Carboxyl End Group (for additive Formula (I)): A 2.0 gram sample was placed in a 150 ml dry beaker and 50 ml benzyl alcohol and the resulting mixture was heated at 180° C. while stirring. The beaker was cooled to 130° C. and three to five drops of phenolphthalein indicator were added to the solution. The solution was titrated with standardized 0.01N KOH in benzyl alcohol. Under similar conditions, the volume of titrant for the blank was determined.

The carboxyl end groups were calculated using the following equation:

$C = [(V_s - V_b) * N * 1000]/W$ where C=carboxyl end groups in $\mu$eq./g.; $V_s$=volume of titrant to titrate sample, in ml; $V_b$=volume of titrant to titrate heated blank, in ml; N=normality of titrant; and W=sample weight, in grams.

(4) Carboxyl End Groups (for additive Formula (II): CTB): The carboxyl end groups for the CTB containing additive was determined using the above procedure (3), except the solution of rubber additive in benzyl alcohol was dissolved at 100° C.

(5) Amine End Groups Determination: A 1.0 gram additive sample was dissolved in 50 ml 80/20 v/v phenol-methanol at room temperature. The solution was titrated to a potentiometric endpoint, using the Mettler automated titrator DL-67 with 0.01N p-Toluenesulfonic acid(PTSA) in methanol. Blank reagents were also titrated. Standardization of PTSA in Methanol was carried out in similar conditions with Tris(hydroxymethyl) aminomethane(TRIS). Calculation of amine end groups was as follows: $A = [(V-B) * N * 1000]/W$ where A=amine end groups, in $\mu$eq/g.; V=volume of titrant, in ml.; B=solvent blank, in ml.; N=normality of titrant, in mol/L.; 1000=conversion to $\mu$eq/g.; and W=sample weight, in g. Amine end group results were reported to the nearest tenth of a unit. Calculation of normality of PTSA solution was as follows: $N = (W \times 1000)/[121 \times (V-B)]$ where N=normality of PTSA solution; W=weight of TRIS in solution, in g; 1000=conversion from ml to L.; 121=molecular weight of TRIS, in g/mol.; V=volume of PTSA used to titrate, in ml.; and B=volume of solvent blank, in ml. $W = (T \times A)/S$ where W=weight of TRIS in solution, in g.; T=weight of TRIS used, in g.; A=weight of aliquot placed in beaker, in g.; and S=total weight of TRIS solution, in g.

(6) X-Ray Photoelectron Spectroscopy ("XPS"). Analysis of the fiber surface was performed using a VG-ESCALAB MK II, manufactured by VG Scientific. The general analytical procedure called for: (a) extracting the fiber to remove surface spin finish; (b) winding the extracted fiber onto a suitable sample holder; and (c) performing the XPS analysis.

Cleaning of the fiber samples to remove spin finish was a very important step since spin finish will mask the analysis. Accordingly, fiber and yarn samples were cleaned of spin finish and other lubricants (e.g., oils, silicones) prior to sample holder winding, so that the true fiber surface could be analyzed. Cleaning was typically performed by hot Soxhlet extraction using an appropriate solvent (e.g., isopropanol, methanol, hexane), with the necessary amount of sample wound onto a cellulose extraction thimble. Typical extraction times ranged from overnight to several days, depending on the fiber chemistry, extractable chemistry and loading, and solvent used. It was very important that the solvent does not attack the fiber sample, which would alter its surface chemistry. After extraction, samples were allowed to dry by evaporation, before winding onto sample holders.

One end of the extracted fiber was secured to a stand, while the other end was tied to the support screw on the sample holder. Cotton gloves were used to grip the sample holder to avoid contamination. The fiber was wound around the holder with light tension, with an appropriate number of turns to completely cover the holder and mask any signals from the metal support. The final wrap was secured by a second screw at the other end of the sample holder. The amount of fiber or yarn wound onto the holder typically depended on fiber thickness, number of strands in the yarn, and amount of incidental stretching of the sample which might occur during winding. The area of the sample holder that was covered by fiber (i.e., the analysis area) was approximately 8×13 mm.

Quantification of elements (atomic percentage) present within the analysis volume was performed according to the following equation:

$$\text{Atomic Percentage of } A = (I_A/SF_A)/\Sigma(I_A/SF_A + I_B/SF_B + I_C/SF_C + \ldots) \times 100,$$

where $I_i$=raw integrated intensity (i.e., peak area minus background in total counts) under the curve of chosen element transition peak in the acquired spectra (e.g., C 1s, Si 2p); $SF_i$=sensitivity factor by which $I_i$ is divided to account for differences in electron ionization cross-section for different elements and transitions, and other factors, such as photoelectron escape depth.

The above formula gives the atomic percentage in approximately the 50 Å layer nearest the surface. To estimate the amount of additive near the surface, the atomic ratio of a distinguishing additive element to a prevalent substrate element such as carbon is determined for the additive and the base matrix material. If at all possible, this distinguishing element should be absent or at least minimal in the base matrix. For nylon 6 Formula (I) additive in PET, the N/C atomic ratio was selected. This ratio was measured for a N6 reference and confirmed to be minimal or absent from the PET base fiber. The % N6 additive in a PET/N6 sample would be taken as:

$$100\% \times (N/C \text{ ratio in the sample}) \text{ divided by the } (N/C \text{ ratio for } N6).$$

For the N6/11 Formula (I) co-polymer additive, the N/C ratio was measured for N6 and N11 fibers separately and the additive N/C was calculated from the component molar contributions using:

$$N/C \text{ (for } N6/11) = \text{mole } \% \times N/C \text{ (for } N6) + \text{mole } \% \times N/C \text{ (for } N11)$$

(7) Molecular Weight: The sample was prepared by derivatizing with trifluoroacetic anhydride in chloroform at 50° C. for 4 hours. The analysis was performed on two 10 micron linear Phenogel GPC columns set at 35° C. using a chloroform mobile phase installed in a Waters Alliance LC with a photodiode array detector (PDA) monitored at 254 nm. A universal calibration was performed against narrow molecular weight polystyrene standards (mol. wt. 400–2,000,000 supplied by Pressure Chemical Company). The Mark-Houwink constants were as follows:

|  | α | K |
|---|---|---|
| Polystyrene | 0.7 | $1.28 \times 10^{-4}$ |
| Nylon | 0.7 | $5.8 \times 10^{-4}$ |

(8) Melting Point: The polymer sample was placed in a hermetically sealed (crimped) pan from TA Instruments. The sample weight was 2–5 milligrams. The melting point of the sample was determined by using a Seiko 220U differential scanning calorimetry (DSC) heated from 30° C. to 250° C. at 20° C./minute in a dry nitrogen atmosphere. The DSC was calibrated at a heating rate of 20° C./minute using the onset of melting for both indium and zinc. Otherwise, ASTM D3418-97 on "Standard Test Method for Transition Temperatures of Polymers by Thermal Analysis" was followed.

(9) Peel Adhesion—D4393-94: Unless otherwise noted, the test rubber used in the Peel Adhesion test comprised of 37 parts natural rubber, 8 parts styrene butadiene rubber, 14 parts ethylene butylene rubber, 28 parts carbon black, 3 parts activator, 1 part accelerator, 2 parts sulfur-containing oil, with plasticizer, tackifier and antioxidant making up the rest of the formulation. A strip of this test rubber is wrapped and secured on a small winding drum. The fiber cord to be tested was then wound over the rubber, at 20 ends of cord per inch of width, to a minimum of 6 inches in width. The cord/rubber tape was removed from the drum, laid flat on a work bench with the exposed cord side facing up. Another strip of rubber, used as backing material, was then placed on top of the cord surface to complete the test pad. Two 6 inches by 8 inches sections were then cut from the test pad. One section was placed on top of the other with the test rubber layers facing each rubber layers at one end of the test pad. Strips of separator film were placed between the test to assure the cords stayed parallel to each other. The test pad was cured in a press at 350 degrees F. for 6 minutes under 333 psi pressure. The cured pad was then conditioned for a minimum of 16 hours at 75 degrees F. Test coupons of 1 inch by 4 inches were cut from the cured pad. For the hot peel test used in the examples, the test coupons were preheated at 250 degrees F. for 30 minutes, and then peeled apart at 4 inch per minute rate, using an Instron Tensile Tester. The maximum force required to pull the test coupon apart was reported as the peel strength in pound per inch.

(10) Abrasion Test—The procedure was a ASTM draft standard (Oct. 28, 1998) where a roughly 2 ft section of yarn was inter-wrapped (7 turns) in contact with itself between 3 pulleys positioned in a way to produced a reproducible intersection angle. One end of the yarn was tensioned by a hanging weight. The other end was drawn back and forth at a defined speed until the yarn breaks due to the self-abrasion within the inter-wrapped region. The inter-wrapped portion of the yarn was submerged in water for "wet abrasion" tests. The cycles to failure was reported along with the applied load (in grams).

(11) Tensile Test—ASTM Designation 2256-97 was used wherein the yarn was placed in "C" Instron clamps without any twisting. The yarn gauge length was 10 inches and the nominal strain rate was 120%/min.

(12) Melt Viscosity—Capillary rheometer measurements were made on dried polymer and using Kayeness Capillary Rheometer (Model Galaxy 5) with 0.3 inch (diameter) by 1 inch (length) die. The polymer was placed in the pre-heated rheometer and melt viscosity was measured at a shear rate of 100 $\sec^{-1}$ starting at least 6 minutes after the sample was introduced into the test chamber.

COMPARATIVE AND INVENTION EXAMPLES

Formula (I) and (II) Additive Examples

In the Examples below, "mol" stands for mole percentage, "Terminator 1" means one end of the polymer, "Terminator 2" means the other end of the polymer, "MP" stands for melting point, "COOH" stands for carboxyl end groups, "FAV" stands for formic acid viscosity, "meq/kg" stands for milliequivalent/kilogram, "$M_w$" stands for weight-average molecular weight, "IV" stands for intrinsic viscosity, and "NA" means not available.

Inventive Examples A1–14

Nylon 6/Nylon 11

In Table I below, Inventive Examples A1 through 14 illustrate how the Formula (I) additive based on a Nylon 6/Nylon 11 copolymer was made. In Table I below, "11AUA" stands for 11-aminoundecanoic acid (x=10 in Formula (I)(a)) and "CL" stands for caprolactam (x=5 in Formula (I)(a)). These batches were made by using the general method set forth above with a 5 gallon unit.

TABLE I

| Add. Id | 11AUA mol | CL Mol | Water Mol | Terminator-1 mol | Terminator-2 (mol) | M.P. (°C.) | COOH meq/kg | Amine meq/kg | FAV | CSP Value | Mw |
|---|---|---|---|---|---|---|---|---|---|---|---|
| A1 | 16.654 | 30.929 | 16.66 | Linoleic acid 1.2044 | Oleyl amine 1.173 | NA | 43.8 | 28.4 | 7.6 | 9.8 | 9800 |
| A2 | 16.654 | 30.929 | 16.66 | Linoleic acid 0.7748 | Oleyl amine 0.7626 | NA | 40.7 | 33.4 | 8.6 | 9.8 | 13150 |
| A3 | 16.654 | 30.929 | 16.66 | Linoleic acid 0.5634 | Oleyl amine 0.5544 | NA | 45.9 | 28.8 | 7.7 | 9.8 | 17500 |
| A4 | 13.881 | 18.5578 | 10 | Linolenic acid 0.5028 | Oleyl amine 0.4912 | 132.5 | 35.3 | 28.5 | NA | 9.7 | 15800 |
| A5 | 6.186 | 30.929 | 16.66 | Linolenic acid 0.7984 | Oleyl amine 0.7802 | 192.6 | 41.5 | 34.5 | 8.9 | 10.0 | 10100 |
| A6 | 6.495 | 32.476 | 16.66 | Linolenic acid 0.3477 | Oleyl amine 0.3398 | 193.6 | 42 | 38.5 | 16.5 | 10.1 | 16500 |
| A7 | 22.42 | 4.485 | 2.42 | Linolenic acid 0.8443 | Oleyl amine 0.825 | 175.7 | 21.7 | 25.3 | NA | 9.4 | 10800 |

TABLE I-continued

| Add. Id | 11AUA mol | CL Mol | Water Mol | Terminator-1 mol | Terminator-2 (mol) | M.P. (°C.) | COOH meq/kg | Amine meq/kg | FAV | CSP Value | Mw |
|---|---|---|---|---|---|---|---|---|---|---|---|
| A8 | 23.195 | 4.639 | 2.5 | Linolenic acid 0.3617 | Oleyl amine 0.3532 | 178.2 | 22 | 27.8 | NA | 9.4 | 19200 |
| A9 | 15.341 | 19.176 | 10.33 | Acetic acid 0.4967 | Cyclohexyl amine 0.497 | 136.3 | 53.2 | 15.1 | NA | 9.8 | 16600 |
| A10 | 6.619 | 33.095 | 17.33 | Acetic acid 0.796 | Cyclohexyl amine 0.796 | 191.4 | 55.9 | 15 | NA | 10.2 | 10200 |
| A11 | 6.619 | 33.095 | 17.33 | Acetic acid 0.3417 | Cyclohexyl amine 0.3424 | 192.9 | 46.2 | 28.2 | NA | 10.3 | 17800 |
| A12 | 23.97 | 4.794 | 25.83 | Acetic acid 0.8417 | Cyctohexyl amine 0.8424 | 177 | 76.1 | 5.1 | NA | 9.5 | 12100 |
| A13 | 24.28 | 4.856 | 26.167 | Acetic acid 0.3667 | Cyclohexyl amine 0.3667 | 178.1 | 51 | 11.3 | NA | 9.5 | 22200 |
| A14 | 14.989 | 27.837 | 15 | Linolenic acid 0.7025 | Oleyl amine 0.6863 | 147.2 | 38.7 | 29.7 | 13.5 | 9.8 | 13700 |

Inventive Examples A15–16

Nylon 6/Nylon 12

Inventive Examples 15 through 16 illustrate how the Formula (I) additive based on a Nylon 6/Nylon 12 copolymer was made. In Table II below, "12 ADA" stands for 12-aminododecanoic acid (x=11 in Formula (I)(a)) and "CL" stands for caprolactam (x=5 in Formula (I)(a)).

TABLE II

| Add Id. | 12ADA mol | CL mol | Water mol | Terminator-1 mol | Terminator-2 (mol) | COOH meq/kg | Amine meq/kg | FAV | CSP Value | Mw |
|---|---|---|---|---|---|---|---|---|---|---|
| A15 | 15.796 | 25.506 | 25.33 | Linolenic acid-0.641 | Oleyl amine-0.6265 | 27.2 | 5.2 | NA | 9.7 | 14800 |
| A16 | 6.632 | 40.209 | 25.77 | Linolenic acid-0.6339 | Oleyl amine-0.6194 | 28.5 | 6.7 | NA | 10.1 | NA |

Inventive Examples A17–19

Dimer Acid

Inventive Examples A17 through 19 illustrate how to make a Formula (I) dimer acid additive. Such dimer acids are commercially available from Cognis as Empol® dimer acids. In the non-limiting examples, Empol® 1008 dimer acid was reacted with caprolactam (CL) and hexamethylene diamine (HMDA) in a 5 gallon reactor. CL and HMDA are represented by X=5 and Y=6 in Formula (I), respectively. Specific formulations are given in Table III below.

Inventive Examples A20 Through 27

Carboxyl Terminated Butadiene

Inventive Examples A20 through 27 illustrate how the Formula (II) additive was made. In Table IV below, "CTB" stands for carboxyl terminated butadiene (degree of polymerization=100), "HMDA stands for hexylmethyidiamine, and "CL" stands for caprolactam. The specific formulations for the 5 gallon reactor batches are given below:

TABLE IV

| Add Id | CTB (mol) | HDMA (mol) | CL (mol) | Terminator (mol) | COOH meq/kg | Amine meq/kg | CSP Value |
|---|---|---|---|---|---|---|---|
| A20 | 1.239 | 2.6 | 2.48 | Stearic acid-1.24 | 25.6 | 9.6 | 8.3 |
| A21 | 1.221 | 1.21 | 8.33 | 0 | 200.2 | 6.2 | 8.4 |

TABLE III

| Add Id | Dimer Acid (mol) | CL (mol) | HDMA (mol) | Terminator-1 (mol) | Terminator-2 (mol) | Water (mol) | COOH meq/kg | Amine meq/kg | FAV | CSP Value | Mw |
|---|---|---|---|---|---|---|---|---|---|---|---|
| A17 | 5.037 | 20.149 | 7.126 | Linolenic acid-0.6163 | Oleyl amine-0.6022 | 5.55 | 23.9 | 11.2 | NA | 9 | 13290 |
| A18 | 4.634 | 23.171 | 6.545 | Linolenic acid-0.6228 | Oleyl amine-0.6086 | 6.39 | 11.8 | 24.9 | NA | 9 | 13730 |
| A19 | 5.709 | 17.126 | 8.073 | Linolenic acid-0.6285 | Oleyl amine-0.6130 | 4.72 | 11.1 | 22.8 | NA | 3 | 13300 |

TABLE IV-continued

| Add Id | CTB (mol) | HDMA (mol) | CL (mol) | Terminator (mol) | COOH meq/kg | Amine meq/kg | CSP Value |
|---|---|---|---|---|---|---|---|
| A22 | 1.233 | 3.9 | 2.7 | Acetic anhydride-3.0 | 50.1 | 27.9 | 8.3 |
| A23 | 1.304 | 3.53 | 0 | Acetic acid-3.04 | 67.6 | 30.3 | 8.2 |
| A24 | 1.353 | 0 | 0 | Oleyl amine-2.64 | 16.4 | 83.9 | 8.1 |
| A25 | 1.346 | 3.641 | 2.833 | Acetic acid-3.255 | 35.4 | 3.9 | 8.2 |
| A26 | 1.183 | 3.912 | 0 | Linoleic acid-2.485 | 27.1 | NA | 8.2 |
| A27 | 1.081 | 2.926 | 22.782 | Stearic acid-2.137 | 63.8 | 9.3 | 8.8 |

Fiber Examples

Unless otherwise noted, PET yarns (1000 denier) containing 0–5% Formula (I) or (II) additive were produced by extruding 300 individual filaments at about 75 pounds/hour. The melted additive was injected prior to the spinneret and then well-dispersed using a static mixer from Komax. The fiber was then spun and drawn by the method of commonly assigned U.S. Pat. No. 5,630,976.

Comparatives 1–3

PET Prior Art

These three comparatives represent the current industrial PET tire yarn state-of-the-art. Comparative 1 (abbreviated "Com 1" in Table V below) is a yarn spun per commonly assigned U.S. Pat. No. 5,132,067 wherein a conventional spin-finish (abbreviated "std" in Table V below) was applied prior to the first godet roll pair. This spin finish consists of heat stable lubricants, emulsifiers, and antistats. Such industrial PET finishes are available from Clariant and Zschimmer & Schwarz under the Afilan and Fasavin product lines. Comparative 2 (abbreviated "Com 2" in Table V below) is that same yarn after it was over-finished with an adhesion activated finish containing a network forming adhesion promoter. U.S. Pat. No. 4,348,517 describes this type of activated finish system. Comparatives 1 and 2 were both made using a continuous polymerization and then spin-draw process. Comparative 3 (abbreviated "Com 3" in Table V below) was produced similar to Comparative 1 except the spin-finish contained the network forming adhesion promoter (abbreviated "network" in Table V below), no over-finish was used, and the polymer was made into pellets (IV=0.95 dl/gm, carboxyl=24 meq/kg) and then re-melted and spun and drawn in a similar manner. The resulting yarns were ply and cable twisted into 1000/2 greige cord with 9.5×9.5 tpi twist. An ammoniated RFL dip was applied and the cord was dried at 350° F. for 60 sec and then heat-treated in at high temperature for 60 sec. The heat-treatment temperature was either 350, 420, or 475° F. The greige and treated cords were tested for in-rubber adhesion performance. The data is summarized in Table V. The beneficial effect of adhesion active finishes for RFL single-dip processes is readily apparent. However, the adhesion performance for the adhesion promoted cords is very temperature dependent. At 475° F. peel adhesion failure occurred almost entirely within the adjacent rubber matrix, so the test was no longer capable of measuring bond strength, except that it was above a critical value for that specific test. The adhesion data at 420° F. is more discriminating and may be used as a measure of the propensity for bonding.

TABLE V

| Fiber ID | Additive Type | Fiber Description | Network spin finish | Overfinish (%) | T Cord Peel Strength 350 F. (lb/in) | 420 F. (lb/in) | 476 F. (lb/in) |
|---|---|---|---|---|---|---|---|
| Com 1 | None | PET | std. | 0 | 6.2 | 5.3 | 11.6 |
| Com 2 | none | PET | std. | 0.7 | | 27.2 | 33 |
| Com 3 | none | PET | network | 0 | 13.8 | 23 | 34.6 |
| F1 | A1 | 2% A1 | network | 0 | 21.9 | 32.8 | 35.9 |
| F2 | A1 | 5% A1 | network | 0 | 18.0 | 37.2 | NA |
| F3 | A2 | 2% A2 | std. | 0 | 7 | 7.2 | 19.3 |
| F4 | A2 | 2% A2 | network | 0 | 17 | 27.2 | 35.3 |
| F5 | A2 | 2% A2 | PGE | 0 | 27 | 36.5 | 35.8 |
| Com 4 | None | PET | std. | 0.4* | | 13.7 | |
| F6 | A14 | 1% A14 | std. | 0.4* | | 18.8 | |
| F7 | A14 | 2% A14 | std. | 0.4* | | 20 | |
| F8 | A14 | 3% A14 | std. | 0.4* | | 19.7 | |
| Com 5 | None | PET | std. | 0.4 | | 16.3 | |
| F9 | A14 | 1% A14 | std. | 0.4 | | 18.2 | |
| F10 | A14 | 2% A14 | std. | 0.4 | | 18.7 | |
| F11 | A14 | 3% A14 | std. | 0.4 | | 23.5 | |
| F12 | A10 | 2% A10 (13% N11/10k Mw/short) | network | 0.6 | | 27.0 | |
| F13 | A11 | 2% A11 (13% N11/18k Mw/short) | network | 0.6 | | 26.7 | |
| F14 | A9 | 2% A9 (44% N11/17k Mw/short) | network | 0.6 | | 27.8 | |
| F15 | A12 | 2% A12 (87% N11/12k Mw/short) | network | 0.6 | | 27.3 | |
| F16 | A13 | 2% A13 (83% N11/22k Mw/short) | network | 0.6 | | 31.0 | |
| F17 | A5 | 2% A5 (17% N11/10k Mw/long) | network | 0.6 | | 31.2 | |
| F18 | A6 | 2% A6 (17% N11/17k Mw/long) | network | 0.6 | | 30.5 | |
| F19 | A4 | 2% A4 (43% N11/16k Mw/long) | network | 0.6 | | 29.7 | |
| F20 | A7 | 2% A7 (83% N11/12k Mw/long) | network | 0.6 | | 29.0 | |
| F21 | A8 | 2% A8 (83% N11/19k Mw/long) | network | 0.6 | | 31.2 | |
| F22 | A17 | 2% A17 | network | 0.6 | | 31.0 | |
| F23 | A18 | 2% A18 | network | 0.6 | | 28.5 | |
| F24 | A19 | 2% A19 | network | 0.6 | | 26.8 | |

TABLE V-continued

| Fiber ID | Additive Type | Fiber Description | spin finish | Network Overfinish (%) | T Cord Peel Strength | | |
|---|---|---|---|---|---|---|---|
| | | | | | 350 F. (lb/in) | 420 F. (lb/in) | 476 F. (lb/in) |
| F25 | A24 | 2% A24 | std. | 0 | 7.4 | NA | NA |
| F26 | A24 | 2% A24 | std. | 0.4 | NA | 22.0 | 34.5 |
| F27 | A24 | 2% A24 | std. | 0.7 | NA | 20.8 | 34.6 |

Cord conversion: 1000/2, 9.5 × 9.5 tpi treated with ARFL dip, dried @ 350 F. for 60 sec heat treated at above temp for 60 sec
*Signifies network 1 overfinish used. All others use network 2 overfinish.

Inventive Examples F1–2

Nylon 6/Nylon 11

This example demonstrates the synergistic adhesion improvement imparted by the presence of low levels of specially designed N6/11 additives in combination with a network forming adhesion promoter. Fibers were made using the same process and base polymer as used for Comparative 3, except that A1 from Table I above was melted and fed to a gear pump which then supplied the molten additive to a Komax Special Injection and Distribution Device for injection into the molten PET polymer. The injected additive was uniformly dispersed in the PET polymer with eight (8) 1.5" Komax Equalizer elements prior to entry into the spin pot assembly. Fibers were made with 1, 2, 3, 4, and 5% additive. XPS analysis of the drawn yarns showed that increasing the additive level increased the additive concentration near the surface. The XPS results are summarized in FIG. A. Based on N/C atomic ratios, this translates to 3, 6, 9, 12, and 12% near the fiber surface compared to 1, 2, 3, 4, and 5% bulk concentration.

The fibers with the 2 and 5% additive, F1 and F2, respectively, were then converted into treated cord and subjected to a variety of adhesion tests. Hot strip adhesion performance is summarized in Table V. It is readily seen that the presence of the additive greatly enhances adhesion.

Inventive Examples F3–5

Nylon 6/Nylon 11

This example illustrates that widely used polyglycidyl ether ("PGE") adhesion promoters also greatly enhance the adhesion performance of the inventive Nylon 6/11 modified PET surfaces. This trial used A2 which had similar chemistry to A1 used for F1 and F2, but as shown in Table I above, A2's molecular weight was higher due to lower levels of end-capping agents introduced during polymerization of the additive. A2 was incorporated into PET yarn at the 2% level using the same fiber-making and cord conversion as used for F1–2. F3 and F4 used standard and network forming spin-finishes, respectively. Example F5 also employed an adhesion active spin-finish, but one based on PGE instead of the network forming adhesion promoter. Such PGE systems are described in U.S. Pat. Nos. 4,462,855; 4,557,967; and 5,547,755. These data again demonstrate the adhesion improvement obtainable by combining the nylon modified and a PET adhesion promotion system.

Inventive Examples F6–11

Nylon 6/Nylon 11 and Comparatives 4 and 5

This example demonstrates that the beneficial effect of the Nylon-modified fiber is still present even when the adhesion activated finish was present as an over-finish. A14 from Table I above was incorporated into PET yarns and then converted into treated cords using the same procedure as F1–5. Comparatives 4 and 5 ("abbreviated "Com 4" and "Com 5" respectively in Table V were made at the same time with the same PET polymer and fiber-making equipment as series F6–8 and F9–11, respectively, except that no additive was injected in Com 4 and 5. XPS measurements on Com 5 and F9–11 gave N/C atomic ratios of 0.0007, 0.0057, 0.0078, and 0.0120 for 0, 1, 2, and 3% injected A14, respectively. This corresponds to a N6/11 concentration of 4.5, 6.0, and 10% in the outer 50 Angstroms (Å) for the 1, 2, 3% bulk additive level, respectively.

The same standard spin-finish was used for all samples, but the two series differed in the exact formulation of the network forming over-finish. Network 2 was a highly catalyzed counterpart of Network 1. Comparison of F6–8 with F9–11 demonstrates flexibility in formulating the network over-finish.

Fibers made with A14 were stained with phosphotungstic acid and examined by TEM. Distinct dark domains with relatively uniform domain sizes in the 0.5–1 micron range indicated that the additive had been uniformly dispersed, and as expected, formed a distinct heterogeneous phase.

Inventive Examples F12–21

Nylon 6/Nylon 11

N6/N11 copolymer molecular weight, N6/N11 weight ratio, and the length of the end-capping agents were selectively varied per a $2^3$ experimental design with Mw and N6/11 weight ratio center points for both the short (F14) and long (F19) end cap agents to establish adhesion sensitivity to these variables. A4–13 in Table I above were injected into the PET polymer melt at a 2% level and made into fibers per the procedure for Examples F1–5. In contrast to F1–5, both network forming spin-finishes and over-finishes were applied. The data in Table V shows that the adhesion performance is robust over the additive ranges studied: 10–22 k Mw, 13–87 mole % N11, and end-cap length. The average adhesion for the five examples (F17–21) made with the longer end-capping agents (linolenic acid and oleyl amine) was 30.3 lb/in versus only 28.0 lb/in for F12–16 with the shorter end-capping agents (acetic acid and cyclohexyl amine).

Inventive Examples F22–24

Dimer Acid

This example demonstrates that other nylons represented by Formula (I) provide the beneficial effect observed for N6/11. A17–19 from Table III above were injected into the PET polymer melt at a 2% level, made into fibers, and then converted into treated cords in the same manner as used for F12–21 above. The adhesion performance (Table V) falls within the same range as exhibited for F12–21, N6/11 examples made under similar conditions.

Inventive Examples F25–27

CTB

This example shows that the invention process is applicable to "rubber-like" polymers represented by Formula (II). A24 from Table V above (carboxyl terminated polybutadiene (degree of polymerization=100) with oleyl amine endcap) was powdered and mixed with powdered PET chip at 2, 3, and 5% CTB additive levels. This mixture was then extruded and then taken-up at 400–700 mpm. The as-spun yarn was then hot drawn off-line in two stages to a 5/1 draw ratio. Examination of the fiber cross-section via TEM after the osmium tetraoxide staining is shown in FIG. C for the 5% sample. Preferential additive concentration at the fiber surface is indicated. The ability to stain the additive clearly indicates that most of the unsaturation in this "rubber-like" additive has survived processing and is available for direct bonding to rubber through proper selection of the rubber cure system to achieve the necessary co-curing. XPS analysis indicates the additive concentration in the outer 50 Å of the fiber cross-section is estimated to be 17, 30, and 34% for 2, 3, and 5% injected additive clearly indicating preferential location near the fiber surface.

The yarn was then converted into treated cord per the Table V protocol. The network over-finish level was varied from 0–0.7%. Excellent adhesion was achieved at the 475° F. treating temperature indicating excellent structural strength integrity throughout the fiber cross-section.

Melt Rheology for Table V Examples

Capillary rheometer data was generated for some of the additives made into the fibers described in Table V. The additives were dried at 80° C. for 16 hours under vacuum. The melt viscosity measurements were made at 100 sec$^{-1}$ at 35–45° C. above the additive melting point as measured by DSC. The actual measurement was taken at the 8–10 min range, but was quite constant throughout the entire measurement cycle. This data is summarized in Table Va. Estimation of the melt viscosity ($\eta$) at other temperatures and molecular weights can be made using the relationships and polyamide constants in POLYMER HANDBOOK, 4$^{th}$ Edition, Page V/127 (J. Brandrup et al. edited, John Wiley & Sons, Inc., 1999).

$\ln(\eta/\eta_o) = 7{,}220[(T)^{-1} - (T_o)^{-1}]$ (for different temperatures)

$\eta/\eta_o = [Mw/(Mw)_o]^{3.4}$ where T is the absolute temperature (in ° K), Mw is the weight-average molecular weight, and the subscript ($_o$) signifies the reference material.

For reference, the melt viscosity of the starting PET polymer used for the Table V examples was measured at 10,720 poise at 290° C. The procedure was modified to minimize the rapid polymer degradation occurring during the rheometer testing at 290° C. This was done by taking viscosity data starting 6 minutes after placing the sample in the rheometer and then at 2 minute intervals thereafter until a polynomial regression can be reliably generated. Then the PET melt viscosity is taken as the zero time extrapolation of that polynomial.

In order to estimate the melt viscosity of the additives in Table V(a) at 290° C., the above referenced relationship was used to calculate the additive melt viscosity at 290° C. This calculation is summarized in Table V(a) for the Nylon 6/Nylon 11, copolymer additives with selectively varied composition and molecular weight (Mw=9,800–22,200) were used. At the experiment extremes, the calculated melt viscosity at 290° C. ranged from 7 to 119 poise. This corresponds to polymer/additive melt viscosity ranging from 90 to 1530. Per Table V, improved adhesion performance was achieved for the F12–F21 series designed experiment using these Nylon 6/Nylon 11 copolymer additives.

TABLE V(a)

| Additive No. | Additive Type | Mw | Temp (deg. C.) | Measured melt viscosity Viscosity (poise) | Calculated melt Viscosity @ 290 C. (poise) |
|---|---|---|---|---|---|
| 6 | N6/11 | 16500 | 234 | 238 | 58 |
| 7 | N6/11 | 10800 | 200 | 79 | 7 |
| 8 | N6/11 | 19200 | 218 | 378 | 58 |
| 10 | N6/11 | 10200 | 231 | 79 | 18 |
| 11 | N6/11 | 17800 | 233 | 392 | 92 |
| 12 | N6/11 | 12100 | 217 | 103 | 15 |
| 13 | N6/11 | 22200 | 218 | 779 | 119 |
| 14 | N6/11 | 13100 | 200 | 280 | 24 |
| 18 | Dimeric Acid | 13290 | 200 | 112 | 10 |
| 19 | Dimeric Acid | 13730 | 200 | 135 | 12 |
| 20 | Dimeric Acid | 13300 | 200 | 196 | 17 |
| 22 | CTB | 100 dp | 194 | 233 | |
| 23 | CTB | 100 dp | 191 | 280 | |
| 24 | CTB | 100 dp | 191 | 187 | |
| PET (Table V base polymer) | | | 290 | 10720 | |

Inventive Examples F28–31

Nylon 6/Nylon 11 and Comparatives 6–8

This example demonstrates the benefit of the nylon-modified surface in the absence of adhesion activated spin-finish and over-finish. In this laboratory study, the additives were prepared with the specific reactor formulations in Table VI. The resulting additives were mixed into PET polymer at a 2% level using twin screw extruder and then spun at conventional low speeds and hot drawn using a laboratory fiber melt spinning unit described in U.S. Pat. No. 5,869, 562. Only a conventional spin-finish was used and no adhesion active over-finishes were applied. ESCA measurements were made on fibers F30 and 31 and the N6/11 concentration near the surface was estimated at 55 and 44%, respectively. The 1000 d yarns were and then twisted to form 1000/2, 11×11 tpi which were then treated with RFL dip containing 4.5% IL-6 (a caprolactam blocked isocyanate adhesion promoter from EMS Chemie). For reference, see G. Kurz, "Grilbond IL6-Bonding Agent between rubber and textile reinforcement," Tire Technology International 1994. The treating conditions were 320/465/455° F. for 120/60/80 sec. The resulting adhesion values are given in Table VI along with those for two Nylon 11 fibers (abbreviated "Com 6" and "Com 7" in Table VI) and one PET fiber (abbreviated "Com 8" in Table VI) made and then converted into treated cord under the same conditions. These data clearly show the performance benefit of the N6/11 modified PET surface (27–29 lb/in adhesion) compared to the PET control (19 lb/in adhesion). Surprisingly, the N6/11 modified PET fiber gave superior adhesion performance versus the Nylon 11 fiber possibly indicating some system synergy. Due to the differences in yarn preparation and cord conversion, the adhesion values for fibers in Table VI are not directly comparable to those in Table V. However, the qualitative trends may be compared.

TABLE VI

Treated Cord Adhesion

| ID | Additive Type | Fiber Description | spin finish | network Overfinish (%) | TC PEEL ADHESION RFL/4.5% IL6@465 F. (lb/in) |
|---|---|---|---|---|---|
| Com 6 | None | N11 base fiber | std. | 0 | 23.1 |
| Com 7 | None | N11 base fiber | std. | 0 | 24.5 |
| Com 8 | None | PET base fiber | std. | 0 | 19.0 |
| F28 | N6/11 | PET base + 2% additive | std. | 0 | 27.4 |
| F20 | N6/11 | PET base + 2% additive | std. | 0 | 28.7 |
| F30 | N6/11 | PET base + 2% additive | std. | 0 | 27.4 |
| F31 | N6/11 | PET base + 2% additive | std. | 0 | 27.9 |

Additive Chemistry

| Fiber ID | Mole Ratio | Monomer 1 | Monomer 2 | End Cap Acid | End Cap Amine | CSP value |
|---|---|---|---|---|---|---|
| Com 6 | 14:1:1 | None | 11-amino undecanoic acid | Stearic acid | octadecyl amine | 9.2 |
| Com 7 | 20:1:1 | None | 11-amino undecanoic acid | Stearic acid | octadecyl amine | 9.2 |
| Com 8 | | | | | | |
| F28 | 20:14:1:1 | 6-amino caproic acid | 11-amino undecanoic acid | oleic acid | octadecyl amine | 9.7 |
| F20 | 26:14:1:1 | 6-amino caproic acid | 11-amino undecanoic acid | Linolic | oleyl amine | 9.7 |
| F30 | 13:7:1:1 | 6-amino caproic acid | 11-amino undecanoic acid | Stearic acid | octadecyl amine | 9.8 |
| F31 | 26:14:1:1 | 6-amino caproic acid | 11-amino undecanoic acid | Stearic acid | octadecyl amine | 9.7 |

*1000/2, 11 × 11 tpi cords treated with RFL with 4.5% IL6. Conditions were: 320/465/455 deg. F. for 120/60/80 sec

Inventive Examples F32–37 and Comparative 9

To further support the Formula (I) representation for the Nylon additive, a series of Nylon chemistries was evaluated. Additives based on end-capped N6, N6/12 and N6/8 copolymers and N6,10 and N6,9 homopolymers were made into fibers using the same protocol as F12–21 in Table V, only the base PET polymer was different. The starting PET chips had an IV of 1.05 and carboxyl end group content of 13 meq/kg. PET fibers featuring N6/11 A14 and no additive (control) (abbreviated "Com 9" in Table VII) were made at the same time. The conversion into treated cord at 420° F. and subsequent adhesion testing was the same as in Table V. The resulting adhesion data is given in Table VII. All 6 invention examples are superior to the PET control without a nylon additive. However, the effectiveness of the different nylons varied with the copolymer additives being the most effective.

Inventive Example F38

Nylon 6/Nylon 11

To further demonstrate the contribution from the N6/11 additive and the adhesion activated finishes, a $2^5$ half factorial designed experiment with center points for 3 variables (spin finish level, over-finish level, and % N6/11) was run using A14 from Table 1 above and the fiber-making and cord conversion protocol of Table V. The 5 independent variables were additive level, spin-finish type (network or conventional), spin-finish level (0.11 & 0.34% for std.; 0.19 & 0.45% for network), over-finish type (2 network formulation variations), and over-finish level. Network 2 over-finish was a highly catalyzed counterpart of network 1 over-finish. The individual sample details are given in Table VIII. The results of the Main Effects and Interaction (Pareto) Analyses using Minitab statistical software are shown in FIG. B. Spin-finish type and additive level are the strongest

TABLE VII

Other Formula (I) Additives

| Fiber ID | Additive Type | Fiber Description | Spinfinish | Network Overfinish (%) | T Cord Peel Strength (lbs/in) |
|---|---|---|---|---|---|
| Com 9 | No additive | PET -control | network | 0.6 | 14.6 |
| F32 | N6/11 copolymer | 2% additive 14 | network | 0.6 | 20 |
| F33 | N6/N12 copolymer | 2% additive 16 | network | 0.7 | 21.4 |
| F34 | N6, 10 homopolymer | 2% additive | network | 0.6 | 19.3 |
| F35 | N6, 9 homopolymer | 2% additive | network | 0.6 | 18.5 |
| F36 | N6/N8 copolymer | 2% additive | network | 0.6 | 25.1 |
| F37 | N6 homopolymer | 2% additive | network | 0.6 | 17.5 |

Treating condition: 1000/2, 9.5 × 9.5 tpi, RFL/1st oven: 350 F., 60 sec/2nd oven: 420 F., 60 sec factors contributing to the adhesion performance. Note that there is a significant interaction between these two factors. The effect of over-finish level is also significant.

TABLE VIII

| SF Type(A) | SF Level (B) | OF Type(C) | OF level (%) (D) | % Nylon(E) |
|---|---|---|---|---|
| std. | low | network1 | 0.4 | 3 |
| network | low | network1 | 0.4 | 1 |
| std. | high | network1 | 0.4 | 1 |
| network | high | network1 | 0.4 | 3 |
| std. | low | network2 | 0.4 | 1 |
| network | low | network2 | 0.4 | 3 |
| std. | high | network2 | 0.4 | 3 |
| network | high | network2 | 0.4 | 1 |
| std. | low | network1 | 0.6 | 1 |
| network | low | network1 | 0.6 | 3 |
| std. | high | network1 | 0.6 | 3 |
| network | high | network1 | 0.6 | 1 |
| std. | low | network2 | 0.6 | 3 |
| network | low | network2 | 0.6 | 1 |
| std. | high | network2 | 0.6 | 1 |
| network | high | network2 | 0.6 | 3 |
| std. | med | network1 | 0.5 | 2 |
| network | med | network1 | 0.5 | 2 |
| std. | med | network2 | 0.5 | 2 |
| network | med | network2 | 0.5 | 2 |

Inventive Example F39

Nylon 6/Nylon 11

This example demonstrates the deleterious effect of having excessive carboxyl and/or amine end-groups, particularly regarding IV loss during spinning and the accompanying deterioration in yarn tensile strength. Toward that objective, N6/11 additives with varying amine and carboxyl end-group content were prepared and then fibers featuring 2% additive were made using the same fiber-making protocol as used for Table V. A control with no additive was also prepared. The data in Table IX shows that with no additive was also prepared. The data in Table IX shows that carboxyl and amine content less than 60 meq/kg or a collective sum less than 120 meq/kg results in an acceptable incremental (versus on additive control) IV loss of less than 0.03 dl/gm. Yarn strengths were in the 7.0–7.5 g/d range. However, excessive strength loss occurred when the amine or carboxyl end-group content was in the 170 meq/kg range.

TABLE IX

Drawn Yarn Characterization

| N—COOH (meq/kg) | NH2 (meq/kg) | Tenacity (gpd) | I.V. (d/g) |
|---|---|---|---|
| 42.0 | 37.7 | 7.32 | 0.906 |
| 46.5 | 40.5 | 7.07 | 0.899 |
| 18.1 | 3.9 | 7.00 | NA |
| 178.5 | 4.1 | 6.66 | NA |
| 14.4 | 176.6 | 6.80 | NA |
| 24.5 | 1.4 | 7.11 | 0.901 |
| 48.3 | 0.8 | 7.08 | |
| 60.0 | 38.0 | 7.38 | ~ |
| 42.0 | 39.1 | 7.47 | ~ |
| 0 | | 7.75 | 0.926 |

Comparative Example BF1–3

Nylon 6 Bicomponent Fiber

Bicomponent fibers representing the prior art were produced using the procedure of U.S. Pat. No. 5,582,913 using nylon 6 chips (FAV=55) for the sheath and PET chips (IV=0.67) for the core polymer. The extruder temperature for the nylon sheath was 258–262° C. and the extruder temperature for the PET core was 275–290° C. These extruders fed a spin block at 290° C. The sheath material comprised 20% by volume of the total fiber. The 272 spun filaments were taken-up at 1000 mpm. These as-spun fibers were then drawn off-line to a 3.7 draw ratio using 4 godet pairs operating at 164, 167, 600, and 582 mpm. Only the middle godet pairs were heated: 90° C. for pair #2 and 190° C. for pair #3. The resulting 1100 denier yarn had tenacity and ultimate elongation of 5.3 g/d and 14%, respectively. These yarns were over-finished with the network-forming additive at 0, 0.3, and 0.7% levels. They were converted into treated cord using the same protocol as Table V. The adhesion data is reported in Table X. The dramatic fall-off in adhesion at the 475° C. treating temperature is consistent with loss of structural integrity within the fiber cross-section, most likely at the sheath/core interface. The invention examples continue to improve at these high treating temperatures.

TABLE X

BiComponent Fibers

| | Yarn Description | spin finish | network Overfinish (%) | 350° F. | 420° F. | 475° F. |
|---|---|---|---|---|---|---|
| BF 1 | Bi-component (20% Nylon 6 sheath) | std. | 0 | 24.2 | 23.8 | 16.8 |
| BF 2 | Bi-component (20% Nylon 6 sheath) | std. | 0.32 | | 24.5 | 17.4 |
| BF 3 | Bi-component (20% Nylon 6 sheath) | std. | 0.74 | | 23.1 | 15.5 |
| com 10 | Nylon 6 | std. | 0 | 40.8 | 41.1/42.7 | |
| com 11 | Nylon 6 | network | 0 | 36.5 | 36.6/44.2 | |
| BF 4 | 5% Nylon 6 sheath | network | 0.6 | 8.4 | 12 | |
| BF 5 | 1% Nylon sheath | network | 0.6 | 13.6 | 21.2 | |
| BF 6 | Nylon 6 fiber | network | 0.6 | 31.5 | 28 | |
| BF 7 | 5% Nylon 6 sheath | std. | 0 | 13.6 | 12.3 | |
| BF 8 | 1% Nylon sheath | std. | 0 | 9.9 | 12.1 | |
| BF 9 | Nylon 6 fiber | std. | 0 | 33.2 | 31.3 | |

Comparative Example BF4–9

Nylon 6 Bicomponent Fiber

An attempt was made to prepare PET fibers with a thin nylon sheath (less than 5%). The process protocol was similar to that described above except a laboratory scale unit was used. This BI-component spinning unit consisted of one 19 mm diameter extruder, one 16 mm diameter extruder, two metering pumps, a spin head, a quench cabinet & spin finish system, and a draw & winder system. The 19 mm extruder supplied the core polymer to a 0.58 cc/rev melt pump and the 16 mm extruder supplies the sheath polymer to a 0.16 cc/rev melt pump. Both pumps fed the spin head that contains a breaker plate and a three-piece spinneret (FIG. D) from which the polymer exits. The core polymer was pumped into the upper spinneret and the sheath polymer is pumped into the lower spinneret via a passageway created by a throttle shim that separates the two spinnerets. Mounted directly below the spinneret and quench cabinet on the extruder frame is a 100 mm Godet. Following the Godet on a separate frame are two heated and one cold 100 mm draw rolls that perform the drawing process. A portable Comoli RPCHS high speed, surface driven winder is used to accumulate the filament.

BI-component fibers having a round cross-section were spun using the above mentioned equipment. The core polymer was PET (IV=0.94) and the sheath polymer was Nylon-6 (FAV=56). Two PET yarns with 1 and 5% Nylon 6 sheath were spun. Each yarn was 8 denier per filament and contained 18 filaments. The core (PET) exit polymer temperature was 290° C. for both samples. The sheath (Nylon-6) polymer temperature was 247° C. for the 5% fiber and 259° C. for the 1% fiber. The melt pump rates for the 5% fiber were 9 grams/min (core) and 0.45 g/min (sheath). The sheath pump rate was reduced to 0.09 g/min for the 1% fiber.

After exiting the spinneret, all fibers passed through a 300-watt 75 mm diameter by 165 mm long sleeve heated to a temperature of 220° C. Two meters below the sleeve, conventional spin finish was applied at a rate of 0.04 g/min after which the yarn goes to the take up roll rotating at 123 meters/min and then on to the two heated draw rolls with a heated draw pin between them. Conditions were as follows:

| Take Up Roll | 123 m/mim | 23° C. |
| Draw Roll #1 | 132 m/min | 70° C. |
| Heated Draw pin | Not applicable | 186° C. |
| Draw Roll #2 | 578 m/min | 110° C. |
| Draw Roll #3 | 575 m/min | 23° C. |
| Comoli winder | 548 m/min | |

The resulting fibers exhibited substantial delamination between the PET core and the Nylon sheath, and as shown in Table X, adhesion performance was poor.

Inventive Examples F40–42

Polyolefin

This example demonstrates the applicability of the invention process to widely different polymer additive chemistries such as saturated polyolefins, provided the four invention process criteria are met. Saturated polyolefins are relatively unreactive as the molten additive in heterogeneous melt blends with PET and on the finished article surface. In this study, polyethylene (CSP value=8.1) was incorporated into PET using the additive injection protocol for F1–27. The polyethylene was a commercial polymer from Dow Chemical. Its melt index was 27 grams per 10 minutes, as measured by ASTM Standard D1238. The fiber-making process was a conventional spin-draw per U.S. Pat. Nos. 4,251,481 and 4,349,501 rather than the high stress process used for F1–27. The data in Table XI show that levels of added polyethylene in the 1–3% range greatly improved yarn-to-yarn abrasion resistance.

TABLE XI

Polyolefin-modified PET fiber

| Yarn ID | Additive Type | Fiber Description | Spin Finish | over finish | Tenacity (g/d) | Yarn-to-yarn Abrasion (cycle-to-break) |
|---|---|---|---|---|---|---|
| com 12 | none | PET - control | Std. | none | 8.4 | 8 |
| F40 | polyethylene | 1.3% PE | Std. | none | 8.8 | 638 |
| F41 | polyethylene | 2.1% PE | Std. | none | 8.5 | 1204 |
| F42 | polyethylene | 3.2% PE | Std. | none | 8.5 | 1305 |

Inventive Example F43

UV Stabilizer

A polyethylene-based additive containing uv "sreens" is made into fibers using the protocol of Inventive Examples F40–42. Improved uv resistance is anticipated.

Inventive Examples F44

Copolymer of Nylon 6,6 and Nylon 11

A copolymer of Nylon 6,6 and Nylon 11 (COOH=142 meq/kg and $NH_2$=3.5 meq/kg with a melt viscosity of 487 poise at a shear rate of 100 $s^{-1}$ @ 200° C. and melt point of 155° C.) was incorporated into PET fibers at a nominal 2% weight percent per the procedure used for Table V. This additive is based on hexamethylene diamine, adipic acid and undecanedioic acid. The intrinsic viscosity for this fiber was 0.89 dl/g. The peel adhesion value obtained for the treated cord was 27.2 lbs./inch against 22.7 lbs./inch for a similarly processed control sample without the said additive. Activated network spin-finish and network finish were applied to both the invention example and control.

| | Additive Type | Fiber Description | Spin-finish | Network Overfinish | T-cord Peel Strength (lbs./inch) |
|---|---|---|---|---|---|
| Comp | None | PET | Network | Network | 22.7 |
| F44 | N6,6/11 | 2% additive | Network | Network | 27.2 |

What is claimed is:

1. A process comprising the steps of:
   (a) adding a substantially organic molten component with CSP value of at least 8 to a molten thermoplastic polymer and mixing to substantially uniformly disperse said molten component in said molten thermoplastic polymer and form a heterogeneous blend wherein
      (i) the melt viscosity of said molten component is substantially less than the melt viscosity of said molten thermoplastic polymer; and (ii) the amount of said molten component in said molten thermoplastic polymer is up to about ten percent by weight based on said heterogeneous blend; and (b) melt processing said heterogeneous blend wherein said molten component preferentially locates near the surface of said molten thermoplastic polymer and substantially no chemical reaction occurs between said molten component and said molten thermoplastic polymer.

2. The process of claim 1 wherein rivet regions form between said molten component and said molten thermoplastic polymer thereby avoiding formation of a sheath/core structure with sharp interface.

3. The process of claim 1 wherein the ratio of the melt viscosity of said molten thermoplastic polymer to the melt viscosity of said molten component at the extrusion temperature is greater than about 10/1.

4. The process of claim 1 wherein said molten component is Formula (I) additive based on an end-capped polyamide or copolyamide of moderate molecular weight comprising one or more of the following units (a) —[—NH—$(CH_2)_x$—C(=O)—]— where x=3–30; or (b) —[—NH—$R_1$—NH—C(=O)—$R_2$—C(=O)—]— where $R_1$ and $R_2$ are independently selected from (i) —$(CH_2)_Y$— where Y=3–30; or (ii) —$CH_2$—$(CH_2$—O—$CH_2)_Z$—$CH_2$— where Z=1–30; or (iii) for $R_2$ only, hydrocarbon component in dimer acid comprising acyclic, monocyclic, bicyclic, and aromatic units and are partially or fully hydrogenated such that the resulting additive has a lower melting point than the molten thermoplastic polymer and the polyamide or copolyamide is terminated to reduce the free carboxyl and amine end-groups wherein the terminating agents have functional groups capable of reacting with the free carboxyl or amine end-groups and consist of a substituted or unsubstituted aliphatic or aromatic having from one to 100 carbon atoms.

5. The process of claim 4 wherein the weight-average molecular weight of said Formula (I) additive is greater than about 1000 to less than about 25,000.

6. The process of claim 4 wherein the weight-average molecular weight of said Formula (I) additive is about 5,000 to about 15,000.

7. The process of claim 4 wherein said Formula (I) additive contains dimer acid.

8. The process of claim 1 wherein said molten component is Formula (II) additive derived from an end-capped polyolefin of moderate molecular weight and comprises any of the following units (a) —[—NH—$R_3$—NH—]—

(b) —[—C(=O)—$R_4$—C(=O)—]— where $R_3$ and/or $R_4$ are polyolefin residues with degree of polymerization (dp) up to 250.

9. The process of claim 8 wherein the weight-average molecular weight of said Formula (II) additive is greater than about 1000 to less than about 25,000.

10. The process of claim 1 wherein said molten component is a polyolefin.

11. The process of claim 10 wherein the polyolefin is unsaturated.

12. The process of claim 10 wherein the polyolefin is polyethylene or a copolymer thereof.

13. The process of claim 1 wherein said thermoplastic polymer is polyester.

14. The process of claim 13 wherein said polyester is polyethylene terephthalate.

15. The process of claim 1 wherein said thermoplastic polymer is polyolefin.

16. The process of claim 1 wherein said thermoplastic polymer is polyamide.

17. The process of claim 16 wherein said thermoplastic polymer is polycaprolactam.

18. The process of claim 1 wherein said molten component contains an ultraviolet screen.

* * * * *